United States Patent [19]

Wenzel

[11] 4,171,068

[45] Oct. 16, 1979

[54] STRIP POSITIONING IN LABEL PRINTERS

[75] Inventor: Jurgen Wenzel, Berlin, Fed. Rep. of Germany

[73] Assignee: Maschinenbau "WAM" M. Osterhof KG., Berlin, Fed. Rep. of Germany

[21] Appl. No.: 878,023

[22] Filed: Feb. 15, 1978

[30] Foreign Application Priority Data

Feb. 15, 1977 [DE] Fed. Rep. of Germany ....... 2706910

[51] Int. Cl.[2] .......... G03B 1/22

[52] U.S. Cl. .......... 226/64; 226/71

[58] Field of Search .......... 226/64, 65, 71; 352/191

[56] References Cited

U.S. PATENT DOCUMENTS

| | | | |
|---|---|---|---|
| 2,223,848 | 12/1940 | Falkenhagen | 226/64 X |
| 2,779,590 | 1/1957 | Seastrom | 226/65 |
| 2,793,562 | 5/1957 | Grenzig | 226/64 X |

*Primary Examiner*—Allen N. Knowles

*Attorney, Agent, or Firm*—Smyth, Pavitt, Siegemund, Jones & Martella

[57] ABSTRACT

The strip is positioned by a positioner hanging from a pivot lever which is turned by a pinion driven follower shaft being journalled in an adjustment lever. That lever is journalled on a shaft with a meshing pinion and turning over particular angles. The adjustment lever is held for adjusting the angular orientation of the shafts to each other, either through spring bias engaging an adjustable stop, by a detent member, or by a rotating cam.

4 Claims, 3 Drawing Figures

STRIP POSITIONING IN LABEL PRINTERS

BACKGROUND OF THE INVENTION

The present invention relates to positioning a strip to be printed on in steps and particularly for label printing.

Label printing requires that the strip to be printed on has to be fed in steps into the printer. The positioning pursuant to feeding involves usually a stroke producing device being driven in steps and in synchronism with the printer. Due to different label formats and lengths, the stroke length as well as the relative position to be arrived at under the printing drum must be adjustable so that the transport member engages the strip in a particular position and moves with the strip for the desired distance.

The known strip positioning devices include a cam operated, stroke producing member whose starting position for each stroke is either adjusted by a spindle or by clamp and rod arrangement or by a control member with an oblong slot. Either adjustment is rather inconvenient because it involves always three steps, release, adjustment, fastening. Also, one usually will loose at least one blank label on account of the changeover and adjustment.

DESCRIPTION OF THE INVENTION

It is an object of the present invention to provide a new and improved strip positioning device, ahead of a label printer, which permits particular adjustment as to starting position for each positioning stroke to facilitate accommodation to different label formats, and without the above-identified three step procedure.

In accordance with the preferred embodiment of the invention, a first, pinion carrying shaft is provided as prime actuator and is turned for particular angles. That shaft serves also as journal for an adjustment lever which carries a second, pinion carrying shaft, the latter being turned by meshing engagement of the two pinions. The second shaft is azimuthally or angularly positioned relative to the first shaft by means of the adjusting lever whose position is releasably maintained in a variety of ways and by adjustable means holding and positioning that lever. The second shaft carries a pivot arm which, in turn, carries the label strip positioning device. Adjustment of the adjustment lever adjusts particularly the starting position for the label positioner. Changing the position of the adjustment lever is simple and can be made, for example, dependent upon label strip cartridges, having corresponding cam features.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 illustrates a stroke producing subassembly being comprised of a driven pivot arm 1 carrying on its end a hinged transport member or positioner 8 whose other end engages a strip 11 of labels to be printed on and for purposes of positioning it.

Figure 1:
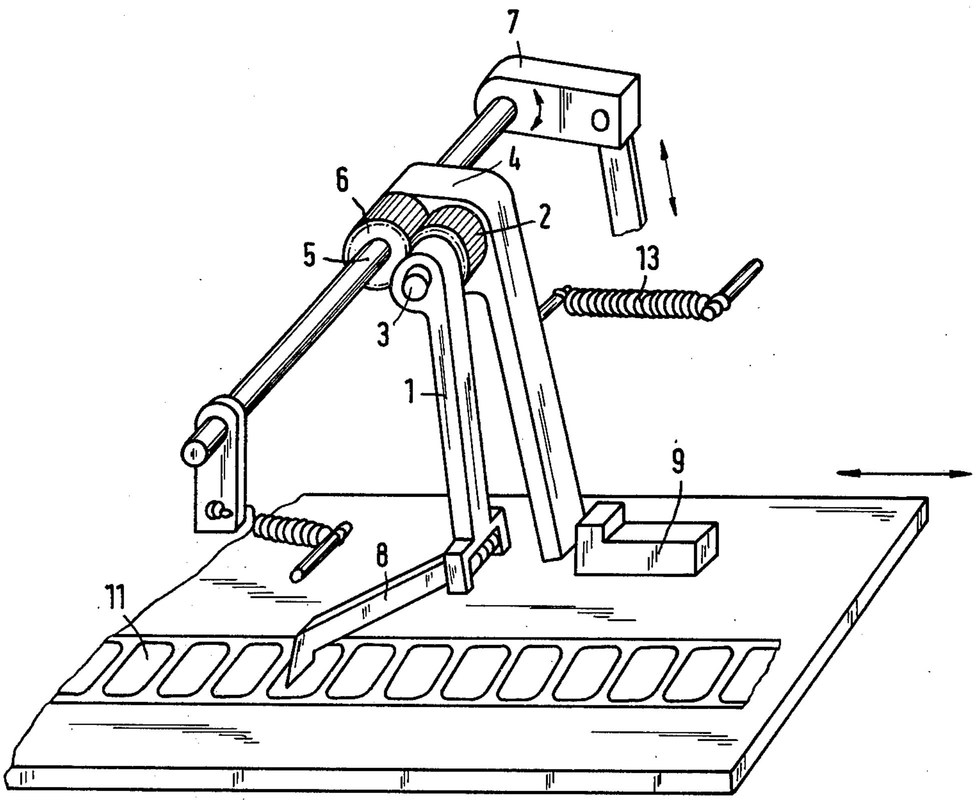
FIG. 1 is a perspective view of the essential parts of a strip positioning device in accordance with the preferred embodiment.

Arm 1 sits on a shaft or axle 3 and pivots upon turning of the shaft. The shaft 3, in turn, is journalled on a lever 4, being the adjustment lever and having a short and a long arm, the arms may have an angle of not quite 90° between them. The short arm of lever 4 is pivotally mounted, i.e., journalled on a shaft 5 whose function is to drive the arm 1. For this, a pinion gear 6 is secured to shaft 5 and meshes a pinion 2 on shaft 3, being a follower shaft accordingly.

A linkage 7 is secured to shaft 5 for turning the shaft. The linkage turns shaft 5 after each printing step, over a particular angle and back to the starting position. The turning motion is transmitted by pinion 6 upon pinion 2 causing shaft 3 to rotate over an angle to thereby pivot arm 1 and to move the positioner 8 over a well defined distance, and in engagement with the strip 11. The strip is moved by a well defined step and for a fixed distance, and another label is brought into the range of the printer (not shown). The stroke of positioning here depends on the angle over which linkage 7 turns shaft 5. The relative orientation of shaft 3 to shaft 5 determines the starting position for each stroke.

The angular orientation of lever 4 as journalled on shaft 5 changes the (angular) orientation of the axis 3 and 5 to each other, and that, in turn, changes the starting position of the operating end of positioner 8. This position change is effected by a stop 9 engaging the long arm of lever 4. A spring 13 biases the arm into abutment with the stop. Thus, for a new adjustment, stop 9 is shifted in one direction or the other and that causes adjustment lever 4 to pivot on shaft 5 to thereby pivot shaft 3 to a different azimuthal position, and angular orientation without, however, disengaging the pinions. As a consequence, the starting position of each positioning stroke vis-a-vis the strip 11 is modified, but retained until stop 9 is shifted again, e.g. by the strip dispensing cartridge itself.

Figure 2:
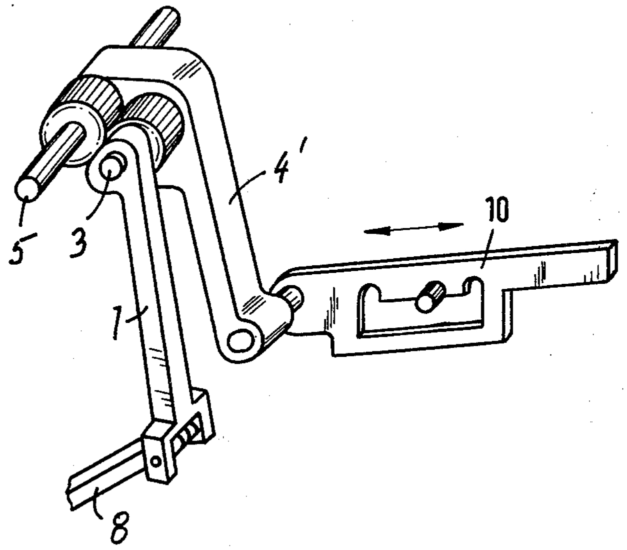
FIG. 2 is a portion and fragmentary view of that device and includes a modification regarding the adjustment lever and its positioning.

FIG. 2 shows the arm of the adjusting lever denoted here 4' to engage a control member 10 which may engage a pin 13 in different stop positions. This way, arm 4' is held in one particular position, but these positions can be changed by placing the stationary pin 13 into different stop or detent positions of member 10.

Figure 3:
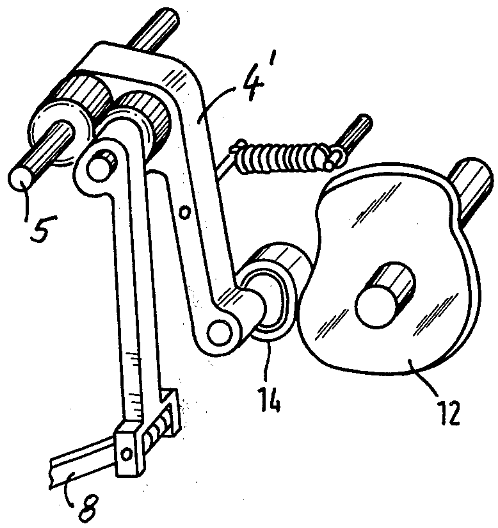
FIG. 3 is a fragmentary view of the same portion, but showing a still different version for the positioning of the adjustment lever.

FIG. 3 shows the arm of lever 4' connected to a cam 14 which, in turn, cooperates with a control cam 12 whose different angular positions turns lever 4' into different directions to move axle 3 about axle 5. This way, one may change the stroke of the positioner between each step. A spring biases the cam 14 into engagement with cam 12, so that each position of adjustment lever 4' is positively retained.

It can readily be seen that each of these label strip positioning devices is adjusted by means engaging and coacting with an adjustment lever for holding and positioning that lever. These means are of quite simple construction, and the choice for the respective means which turns and holds the lever 4, 4' may depend on circumstances of use and environment. In each instance, a mere pivoting of lever 4, 4' changes the starting position and is positively retained until a change is desired. In neither case is it necessary to release a clamp or the like and to refasten it after the adjustment.

The invention is not limited to the embodiments described above but all changes and modifications thereof not constituting departures from the spirit and scope of the invention are intended to be included.

I claim:

1. A strip positioning device for a label printer comprising:

a first shaft;

means for turning the shaft back and forth over particular angles;

a first pinion on the first shaft;

an adjusting lever journalled on the first shaft;

a second shaft journalled on the adjusting lever and extending parallel to the first shaft so that the azimuthal orientation of the second shaft varies upon pivoting of the adjusting lever about the first shaft;

a second pinion secured to the second shaft, and meshing with the first pinion, so that upon turning of the first shaft, the second shaft is turned also by operation of meshing of the first and second pinions;

a pivot lever on the second shaft and being pivoted upon turning of the second shaft;

transport means connected to the pivot lever for engagement with the strip; and means for particularly, adjustably positioning the adjusting lever and releasibly holding it in the adjusted position.

2. Device as in claim 1, said means for positioning the adjusting lever including adjustable stop means and resilient means biasing the lever against the stop means.

3. Device as in claim 1, said means for positioning including detent means engaging the lever and holding it in one of several different positions.

4. Device as in claim 1, said means for positioning being cam means to hold the lever in a particular position, and means for biasing the lever into engagement with the cam means.

* * * * *